United States Patent Office 2,837,414
Patented June 3, 1958

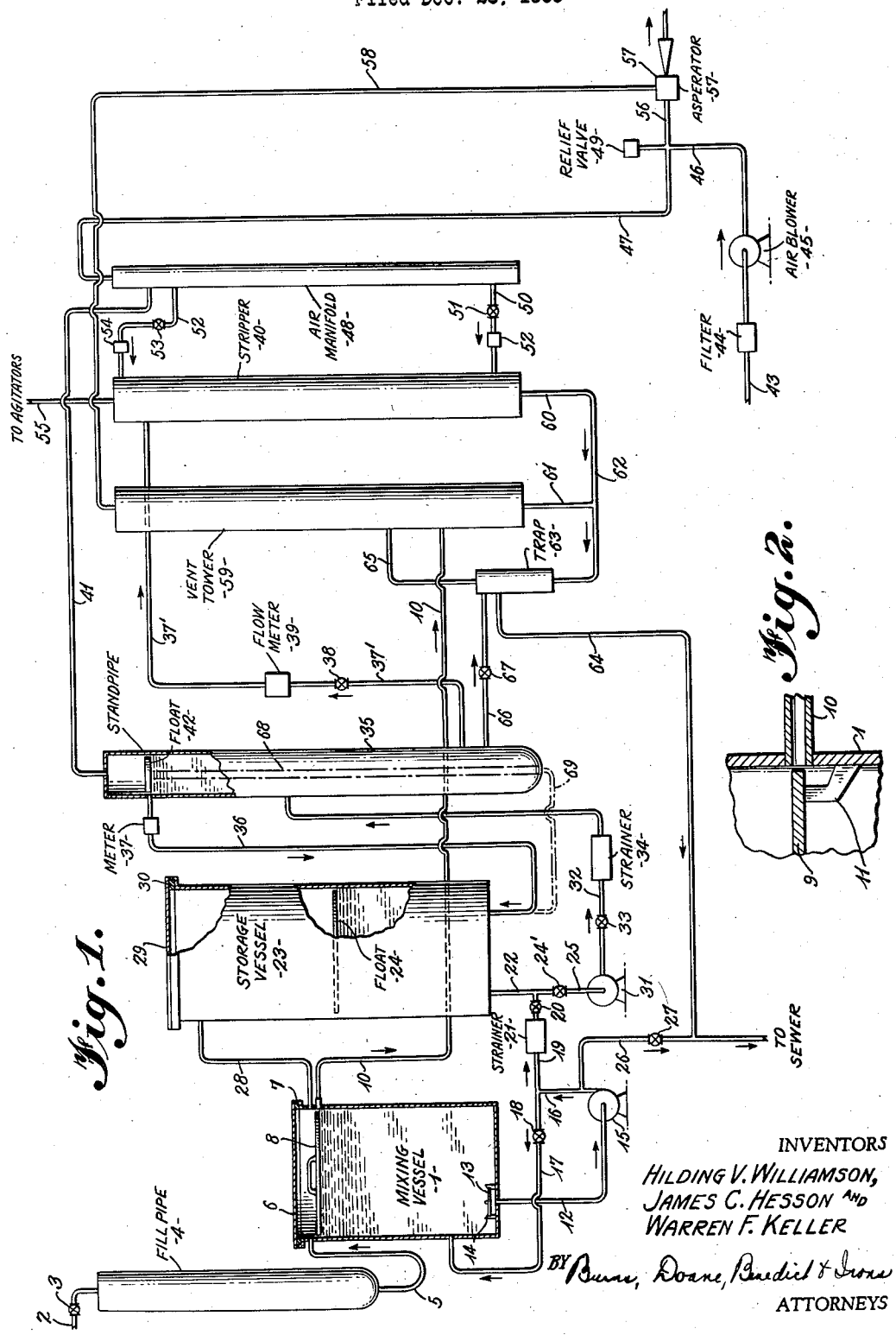

2,837,414

APPARATUS FOR DISPENSING CHLORINE DIOXIDE

Hilding V. Williamson, Chicago, and James C. Hesson, Riverdale, Ill., and Warren F. Keller, Overland Park, Kans., assignors to Cardox Corporation, Chicago, Ill., a corporation of Illinois Application December 28, 1953, Serial No. 400,604

3 Claims. (Cl. 23—260)

This invention relates to a method and apparatus for regenerating chlorine dioxide from solid chlorine dioxide hydrate to produce a dilute gaseous mixture of chlorine dioxide and an inert gas for use in treating flour and other materials.

Chlorine dioxide has, within recent years, replaced nitrogen trichloride as an agent for aging and improving grain and flour. Because of the unstable character of chlorine dioxide, it has heretofore been necessary to produce it at the point of use. This results in both technical and economic problems. In treating fluor, for example, less than one gram and generally 0.2 to 0.75 gram of chlorine dioxide is used to treat 100 pounds of flour. Thus a mill producing 1000 hundred weight of flour will generally use less than 750 grams (1.65 pounds) per day of chlorine dioxide. The direct production by known methods requires careful control and servicing by a skilled technician, often not available. The chemicals employed require careful handling, and if the chlorine dioxide concentration is allowed to become too great there is danger of explosions. The waste products often present a disposal problem. None of these problems are insurmountable if the daily production of chlorine dioxide were sufficient to justify constant attendance by skilled operators, but because of the small amount needed for the most part, the cost of this becomes prohibitive.

In a co-pending application Serial No. 266,814 is described a method for producing chlorine dioxide hydrate which is non-explosive and can be prepared at a central point where control of the production of the chlorine dioxide used in making the hydrate can be controlled by skilled operators. The solid hydrate can be made into blocks or sold in containers having a known weight and predetermined chlorine dioxide content. The hydrate can be safely stored at low temperatures for long periods of time with negligible change in its chlorine dioxide content. It can be shipped, for example, by trucks to the mill and kept there under refrigeration in a device similar to the familiar home freezers. The chlorine dioxide can be generated from the blocks as needed, leaving a residue consisting of water, thus eliminating waste disposal problems.

It is an object of the present invention to provide an apparatus in the form of a compact unit, by which the chlorine dioxide contained in the solid hydrate can be safely and reliably regenerated, mixed with air, and supplied in the desired proportions to the flour-aging operation (or other operation) without the necessity of employing highly trained operators and with no danger of explosion. While the operation is herein described in connection with the aging of flour, it will be apparent that the process can be used wherever dilute gaseous mixtures of chlorine dioxide is useful.

Figure 1 is a diagrammatic illustration of the apparatus showing the flow therethrough.

Figure 2 is a sectional detail of construction of the mixing vessel.

Figure 1 is a typical flow diagram wherein the various components of the apparatus are represented diagrammatically. A mixing vessel 1 is provided in which a known weight of chlorine dioxide hydrate containing a known percentage by weight of chlorine dioxide is dissolved in a known volume of water. Water is introduced through line 2, valve 3 and fill-pipe 4, passing through trap 5 into the top of the mixing vessel. The mixing vessel 1 comprises a generally cylindrical vessel made of any suitable corrosion resistant material, among which is polyethylene. The vessel is equipped with a removable top 6 which may rest upon a suitable soft gasket 7. The vessel is preferably provided with a transparent polyethylene float 8. The float has just sufficient clearance from the sides of the vessel to permit it to float freely. An overflow line 10 leads from the vessel, this being located at a point such that when the vessel is filled until it overflows through line 10, it will contain the desired volume of water.

As an alternative, a false lid 9 resting on lugs 11, as shown in Figure 2, may be provided. The lid should rest as closely as possible on the surface of the solution when the tank is full. Lug 11 is located directly in front of the inlet to pipe 10 so as to prevent any plugging of the opening by any floating object in the vessel such as the container in which the hydrate is added. Other lugs of which may be several as required, may be rectangular blocks attached to the walls at spaced intervals. The lid 9 is preferably equipped with a handle as illustrated, to permit its being readily removed. The purpose of the false lid on the float is to reduce the exposed surface of any liquid within the mixing vessel. The mixing vessel, as will be explained in more detail hereinafter, is maintained under a slight vacuum of about 1 to 4 inches of water and, because of leakage around lid 6, some movement of air occurs in the vapor space. By keeping the exposed surface at a minimum undue loss of chlorine dioxide due to the stripping action of the air is minimized.

The mixing vessel 1 is provided with an outlet 12, over which is positioned a circular glass plate 13 which may be held in place, in spaced relationship, suitably ¼ to ½ inch from the bottom of the lugs 14. This prevents plugging of the opening by any solids such as undissolved hydrate, and additionally prevents whirlpool action of the liquid which might permit air to be sucked into the pump, thus interfering with its operation.

Line 12 leads to a Duriron centrifugal pump 15 which may discharge through lines 16 and 17 in which there is a valve 18. A line 19 containing valve 20 and strainer 21 leads to line 22 and discharges into a storage vessel 23. By closing valve 20 and opening valve 18 liquid may be pumped from the vessel 1 and thence back into the vessel to provide agitation while the hydrate is being dissolved. In operation, the mixing vessel is filled with water until it overflows through line 10 and the water is turned off. The float or false lid, as the case may be, are then removed and the chlorine dioxide hydrate is dropped into the vessel, the float is replaced. In practice the chlorine dioxide is packaged in a polyethylene container which after removal of its lid is dropped into the vessel. Since the package of hydrate is heavier than water it will drop into the bottom of the vessel. By circulating the liquid as previously indicated the hydrate is dissolved.

When solution is complete valve 18 is closed and valve 20 is opened and the solution is pumped from the mixing vessel into storage vessel 23. The strainer 21 is provided merely to remove any coarse solids which might plug the equipment in later stages. The strainer may suitably be of woven plastic- or glass-fabric screen. Valve 24 in line 25 is normally open except when the pump is disconnected for repairs. The transfer does not interfere with the subsequent operations. After transfer, valve 20 is closed and water is again introduced into mixing vessel 1. The vessel will contain a small amount of the chlorine dioxide solution which is thus diluted. When desired, the vessel can be rinsed and the rinsings withdrawn to the sewer through line 26 containing valve 27.

The storage vessel 23 is generally made of polyethylene and contains a black polyethylene float 24 which is of slightly lesser diameter than the storage vessel, sufficiently so that it will move readily up and down with change in the liquid level. It is sufficiently large that only a small surface of the solution is exposed. The float serves the dual purpose of minimizing loss of chlorine dioxide from the solution by minimizing exposed surface, and of providing a convenient means for observing the level of the solution in the storage vessel. With a translucent polyethylene float it is difficult to observe the exact level of the amber colored solution in the vessel. However, the position of the dark colored or black float can be readily observed. A line 28 leads from the vapor space in storage vessel 23 to the vapor space of mixing vessel 1 so that the vapor space in the storage vessel is always under a slight vacuum, as will be explained. The concentration of chlorine dioxide in the gas phase within the storage vessel is susbtantially less than 10% by volume, which is the lower explosive limit. The storage vessel is provided with a tightly fitting lid 29 fastened by suitable means to flanges 30.

To supply the solution, which is of a known and substantially constant concentration, to the subsequent stripping step, valve 20 is closed, valve 24' is opened and the solution in a volume in excess of plant requirements, is pumped by means of pump 31 through line 32, valve 33 and strainer 34 to the standpipe 35. The standpipe is filled with solution and the excess solution passes through line 36, which may be provided with a flowmeter 37 and is returned to the storage vessel 23. The solution which is passed to the strippers passes through line 37' containing valve 38 and an accurately calibrated flowmeter 39 to stripping tower 40. The standpipe is maintained under a slight superatmospheric pressure generally not more than about 12 to 18 inches of water by means of air pressure supplied by line 41, as will be more fully explained hereinafter. The maximum pressure is limited by the depth of the trap formed by the bottom portion of line 36. If the pressure is too high air would be blown into the storage vessel. This air pressure causes liquid to flow through line 37'. Preferably the overflow outlet is located at the same level as the inlet to the stripping towers and no gravity flow occurs. In the event of air failure, solution flow ceases. Alternatively the overflow level may be higher than the inlet to the towers and the standpipe may be vented. This provides gravity flow but has the disadvantage that flow does not automatically cease if air failure occurs. The meter 37 is provided in line 36 in order that the operator may judge the amount of excess solution being pumped into the standpipe and may reduce or decrease the amount supplied as desired. As an optional feature, instead of a meter it is sometimes convenient merely to construct line 36, or at least that portion near the top, of a transparent material so that the operator can visually observe the overflow of liquid which is being returned to the storage vessel and can make such adjustments as are needed based upon his observations. As an optional feature the upper part of the standpipe may be made of transparent or translucent material and may be provided with a dark float 42, particularly when using the gravity flow alternative, so that the operator can observe the level in the standpipe.

Referring to the lower right hand side of the drawing, air is supplied to the system through line 43 containing a filter 44. The filter may merely remove foreign particles from the air or it may additionally comprise a dehydrating agent such as silica gel, activated alumina or the like to remove water vapor from the air and thus reduce its humidity. An air compressor 45 which may be a Root-Connerville blower, forces the air through line 46 and line 47 into the air manifold 48 from whence it is distributed to the stripping towers. A pressure relief valve 49 is provided to maintain the air at the desired superatmospheric pressure. Air passes into the bottom of stripper 40 through line 50 which optionally may be provided with valve 51 and a meter 52, although these are generally not required. This portion of the air passes upwardly through stripper 40, which may be filled with a suitable packing material such as marbles, Berl saddles and the like, countercurrent to the solution of chlorine dioxide being introduced from line 37. This causes the chlorine dioxide to be stripped from the water. The air emerges at the top of the column and is mixed with additional air coming through line 52, which optionally may be provided with valve 53 and meter 54. As a practical proposition, if the size of the lines 50 and 52 are properly chosen, there is no need for the valves or meters. These are convenient when a battery of from four to six strippers are used, and when the amount of air distributed to some of the stripper is substantially greater than to others. However, the important factor in the treatment of flour with chlorine dioxide-inert gas mixtures is the amount of chlorine dioxide supplied per hundred weight of flour and the volume of air supplied is of no particular significance. It need only be sufficient to substantially completely strip the chlorine dioxide from the solution, with enough added at the top of the tower to reduce the humidity to a point below that at which condensation of water will occur in the line. When charging 8 liters per hour of solution, for example, 200–300 cubic feet of air may be passed through the strippers and a like or greater amount added to the stripper effluent.

It will be apparent that that portion of the air which is passed through the stripper will be substantially saturated with moisture. The advantage of adding the additional dry air through line 52 is that the average humidity of the mixture of air and chlorine dioxide emerging from the stripper through line 55 will be substantially less saturated. As a consequence there is little or no danger of condensation of moisture in line 55, which because of the corrosive nature of chlorine dioxide solutions would be highly undesirable. Moreover, the accumulation of such condensate might result in slugs of solution being introduced into the flour which again would be undesirable. The expedient adopted obviates any such difficulties.

It is apparent that additional strippers can be provided and that these can be supplied with air by merely providing additional air outlets in the manifold 48. It is also evident that they can be supplied with solution from the standpipe 35 by providing additional lines and meters. For purposes of simplifying the drawing, only a single stripper has been shown but in practice, several, generally four to six, are used.

Line 41 leads from the air manifold to the standpipe and it is apparent that the standpipe will be under a slighty elevated pressure which will cause the solution to flow through line 37. It is also evident that should the air supply fail the flow of solution through line 37 would immediately stop, since the flow depends upon there being pressure applied to standpipe 35 and since the overflow level in the standpipe and the solution inlet to the tower are at substantially the same height.

Also connecting with the air supply line 46 is a branch line 56 which leads to an aspirator 57 which discharges into the atmosphere. On the suction side of the aspirator is line 58 which leads to the vent tower 59 to which is connected the overflow line 10. The aspirating effect thus places the vent tower 59 under slight vacuum (1–4 inches of water) and since the pipe 10 leads to the mixing vessel 11, pulls a slight vacuum on the vapor space therein and because of line 28, also reduces the pressure within the storage vessel 23. Line 10 serves the dual purpose of permitting drainage of excess water from mixing vessel 1, and of supplying the slight vacuum on the two vessels.

The stripping tower 40 and the vent tower 59 are connected through lines 60 and 61, respectively, to a drain manifold 62 which in turn is connected to a trap 63 which is provided with an overflow line 64 leading to the sewer. When additional towers are used they are similarly connected to the drain manifold. It will be evident from this that the vent tower and the stripping tower will always have a water seal at the bottom. Water from towers drain through the drain manifold and the trap to the sewer. The water from stripping tower 40 is substantially free of chlorine dioxide because of the stripping action of the air. A line 65 small enough to prevent drawing excessive amounts of air from the sewer line, connects the top of the vapor space in trap 65 with the vapor space in vent tower 59 so as to prevent any siphoning of water from the towers which would break the liquid seal. Alternatively, trap 65 may be vented to the atmosphere.

Line 66 containing valve 67 is provided between the standpipe 35 and the trap 63 as a convenient means for draining the standpipe during shut-downs.

All lines and vessels, as well as pumps, which come in contact with chlorine dioxide solution are made of suitable corrosion resistant materials. Polyethylene and Saran are used. Line 37 is preferably polyethylene and when this is used valve 38 may conveniently be a pinch clamp whereby the walls of the line may be compressed and the flow of liquid therethrough can thereby be accurately controlled. The stripping towers and many of the lines may suitably be of Saran plastic which has been found to withstand the corrosive effects of chlorine dioxide. Other suitable materials will be apparent to one skilled in the art.

The flowmeter 39 may suitably be a rotameter which is well known. Briefly, this comprises a slightly tapered transparent tube in which is a bob which comes to a balanced position depending on the rate of flow of liquid therethrough. Since the concentration of chlorine dioxide in the solution is known and is always substantially constant, the rotameter may be calibrated in terms either of volume of solution delivered, or, more conveniently, in terms of the amount of chlorine dioxide being delivered to the stripping towers and thence to the agitators.

Standpipe 35, instead of being of the design just described, may alternately comprise the outer shell and an inner overflow tube 68 connected with line 69. In this case any excess solution is returned through line 69 to the storage vessel. The structure is indicated by the dotted lines.

THE OPERATION

The mixing vessel 1 is initially filled with water at a temperature of 50–90° F., to the level of pipe 10. In a typical operation the vessel is designed to contain 170 pounds of water. The operator removes the lid and the false lid and introduces the solid chlorine dioxide hydrate by dropping in a weighted amount of hydrate. In practice, chlorine dioxide is supplied in a nine pound package analyzing about 16% chlorine dioxide, in rectangular polyethylene containers having a tightly fitting lid. Because of the low concentration of chlorine dioxide in the vapor space in the mixing vessel, he is not subjected to sufficient fumes to cause any danger or discomfort. Before introducing the fresh container, he tilts the float and fishes out the container used in the preceding batch. He then removes the lid form the container and drops the container and contents into the mixing vessel where it sinks to the bottom. He then replaces the lids on the mixing vessel and agitates the contents by means of the circulating pump 15 until solution is complete. The solution contains 0.9% of chlorine dioxide. When the contents of the storage vessel approaches exhaustion, a second batch of solution can be made and added to the storage vessel without interrupting the dispensing operation. Depending upon the capacity of the mill and the requirements of chlorine dioxide for treatment, this amount of solution will be sufficient for one to three days operation. In some large installations, four to five or more batches per day may be required.

After the liquid has been transferred to the storage vessel, which is at room temperature, the mixing vessel may be rinsed out, the rinsings being drained to the sewer. This eliminates the small amount of rather concentrated solution remaining in vessel 1. The drain line is then closed and the mixing vessel is again filled to capacity so as to minimize the vapor space in which chlorine dioxide-containing gas can accumulate. The container, which floats, can be removed at this time or before the next batch is made.

As previously explained, both vessels are maintained under a slight vacuum by virtue of the operation of aspirator 57 so if there is any gas leakage in either the storage vessel or the mixing vessel, it is inward and consequently no unpleasant fumes can escape into the room. Because the system of floats keeps the exposed liquid surface small, and since at 0.9% chlorine dioxide solution concentration the equilibrium value of chlorine dioxide in the vapor space cannot exceed 10%, the combined effect of reduced surface area of the liquids and the tendency of chlorine dioxide in the gas phase to slowly decompose, acts to keeps the chlorine dioxide concentration in the vapor space of the storage vessel well below this figure, and well below that at which explosion can occur.

The amount of solution pumped to the standpipe is kept slightly in excess of that required to supply solution to the battery of strippers, these usually being four to six in number. In operation the pump is started, the solution being filtered to remove any stray particles of foreign matter that might be present. The filtered solution flows into the standpipe, the excess overflowing and being returned by virtue of both the liquid head and slight air pressure on the standpipe, to the storage vessel. This excess is kept at a minimum to avoid unnecessary agitation of the solution.

Solution is passed through the supply lines to the towers that are in operation, the amount being based on the chlorine dioxide requirements of the agitator which each tower supplies. As previously mentioned, the flowmeters can be calibrated so that the operator, knowing the requirement for each tower, can make his settings directly in terms of grams of chlorine dioxide per hour. This is the single important control point on the plant to insure delivery of the correct amount of chlorine dioxide for proper treatment.

The air passing upwardly through the stripping towers countercurrent to the descending solution effectively strips the solution of its chlorine dioxide content. The residue is water substantially free of chlorine dioxide and this discharges through the drain manifold to the sewer. No disposal problem is presented.

The ratio of stripping air to solution is dependent on the stripping temperature, concentration of solution and concentration of chlorine dioxide desired in the final gas mixture. This is shown in Table I.

Table I

| Run No. | Solution, ClO₂, Wt. Percent | Volume Ratio, Air/Soln. | Exit Gas, ClO₂, Vol. Percent | Chlorine Dioxide Recovery, Wt. Percent |
| --- | --- | --- | --- | --- |
| 1 | 0.48 | 20 | 4.9 | 81 |
|   |      | 86 | 2.01 | 87 |
|   |      | 120 | 1.33 | 91 |
|   |      | 185 | 0.84 | 91 |
|   |      | 300 | 0.46 | 91 |
|   |      | 600 | 0.23 | 91 |
| 2 | 1.12 | 20 | 10.32 | 71 |
|   |      | 120 | 1.95 | 88 |
|   |      | 217 | 1.10 | 89 |
|   |      | 285 | 0.81 | 92 |
|   |      | 610 | 0.37 | 96 |
| 3 | 1.87 | 23 | 14.08 | 72 |
|   |      | 120 | 3.50 | 94 |
|   |      | 300 | 1.31 | 97 |
|   |      | 600 | 0.74 | 98 |

The determinations were made experimentally by passing solution and air at 77° F. through a glass column one inch in diameter and packed with eleven inches of 3/16 inch glass helices. The solution was fed at a rate of 6.33 cc. a minute. The efficiency of recovery can be improved by increasing the length of the packed section since in the apparatus used the spent solution still contained some chlorine dioxide.

In the preferred operation a gas mixture is produced containing about 1% by volume of chlorine dioxide by stripping a solution of about 1% concentration, the exit gas being diluted with air of low humidity, to about 0.5% chlorine dioxide concentration before being passed to the agitators. The volume ratio of air to solution through the stripper is in the range of about 200-300 to one. The selection of these conditions is based upon overall factors of plant design and operation as well as the particular end use requirements. Other use requirements or changes in plant design might dictate selection of other conditions as will be apparent.

The enriched air passing through the tower is substantially saturated with water vapor due to its contact with water in the stripping column. This air is mixed with an additional quantity of air of lower humidity from the manifold at a point above the emergence of the air from the stripping section. The purpose of this additional air is not only to furnish further dilution but to reduce the humidity of the air to a point below that at which condensation could occur in line 55, or at any other point between the stripping tower and the flour agitator. In general the concentration of chlorine dioxide is about 0.5% by volume in the final air mixture although this is not critical, and rather wide variations therein do not affect the end result. A unit comprising six stripping towers each capable of delivering 75 grams of chlorine dioxide per hour or more to flour agitators may be assembled in a cabinet about 7 feet high, 3½ feet long and 2½ feet deep. The blower, air filter and aspirator are usually housed outside of the unit and suitable connecting lines are supplied. The unit can be made up at a central manufacturing point and shipped to the mill. It can be moved into place and hooked up merely by supplying the water supply lines, the air compressor and lines, and the lines from the stripping tower to the agitators.

Having described the invention but by no means intending it to be limited to the exact form shown, we claim as our invention:

1. An apparatus for generating chlorine dioxide from chlorine dioxide hydrate and forming a dilute mixture of chlorine dioxide with an inert gas, comprising mixing means for forming a dilute aqueous solution of chlorine dioxide of known concentration, a storage vessel, means for intermittently passing batches of said solution to the storage vessel from said mixing vessel, a constant-level standpipe, means for continuously passing solution in excess of plant requirements from the storage vessel to the standpipe, overflow means in the standpipe positioned above said last named means, a conduit connecting the overflow means with the storage vessel for returning the excess solution from the standpipe to the storage vessel by gravity flow, a stripping tower provided with a gas outlet at the top and a liquid-withdrawal outlet at the bottom, a second conduit connecting the solution-containing portion of the standpipe to the top of the stripping tower at a point substantially the same level as said overflow means in said standpipe, flow control means and a flowmeter in said second conduit, means for introducing air into the bottom of the stripping tower countercurrent to solution flowing therethrough to form a dilute mixture of chlorine dioxide and air, pressure means communicating with the gas outlet of said tower for adding additional air of lesser humidity to the gaseous mixture emerging from the top of the stripping tower, and pressure means for maintaining the solution in said standpipe and said second conduit at a pressure sufficiently greater than that in said stripping tower thereby to cause flow of liquid from the standpipe to the stripping tower.

2. An apparatus for forming a mixture of chlorine dioxide and inert gas from solid chlorine dioxide hydrate which comprises, means for forming batches of chlorine dioxide solution by dissolving a known quantity of said hydrate in a known volume of water to form an aqueous solution of chlorine dioxide of known concentration, said means including a mixing vessel of greater volume than the volume of water to be added thereto, a storage vessel, a pipe connecting the vapor space in the storage vessel to the vapor space in the mixing vessel, a vent tower, an overflow line from the mixing vessel to the vent tower, means for maintaining the vent tower under vacuum, means for intermittently passing batches of said solution from the mixing vessel to said storage vessel, a constant-level standpipe, means for continuously passing solution, in excess of plant requirements, from said storage vessel to said standpipe, overflow means adjacent the top of said standpipe, means for continuously returning solution from the overflow means to the storage vessel, a stripping tower, a conduit connecting the standpipe with the stripping tower, means for controlling the flow of solution through said conduit, a flowmeter in said conduit, said conduit connecting the solution containing portion of said standpipe to the top of said tower at a level not substantially below that of the top of the overflow means of said standpipe to obviate substantial gravity flow of liquid from the standpipe to the stripping tower, means for removing gas from the top of the stripping tower, an air manifold, means for supplying air of relatively low humidity under pressure to the manifold, an air conduit connecting the manifold to the bottom of said stripping tower, a second air conduit connecting the manifold with the gas-removing means to supply additional air to the gas mixture emerging from the stripping tower, a third air conduit connecting the manifold with the top of the standpipe to impress air pressure thereon, means for removing water from the bottom of the stripping tower, means for removing water from the vent tower, and means for maintaining a water level in the bottom of said stripping tower and said vent tower.

3. An apparatus for generating chlorine dioxide from chlorine dioxide hydrate and forming a dilute mixture of chlorine dioxide with an inert gas which comprises a batch mixing vessel for dissolving chlorine dioxide hydrate in water to form a solution of known concentration, a storage vessel, means for intermittently passing batches of said solution from the mixing vessel to the storage vessel, means for maintaining a slight vacuum on both vessels, a standpipe provided with an overflow means to maintain a constant level of solution therein, means for passing solution in excess of plant requirements from the storage vessel to the standpipe, means for returning excess solution from the standpipe to the storage vessel, a plurality of stripping towers provided with gas outlets at the top thereof, conduits from the standpipe to the tops of the stripping towers, flow control means and a flowmeter in each of said conduits, an air manifold, means for supplying air at constant pressure to the manifold, first air conduits from the manifold to the bottom of each of said towers to supply stripping air, second air conduits connecting the manifold to said gas outlets to supply additional air to the mixture of stripping air and chlorine dioxide emerging at the top of the tower, a third air conduit connecting the manifold to the top of the standpipe to impress air pressure on the column of liquid therein.

References Cited in the file of this patent

UNITED STATES PATENTS

| | | |
|---|---|---|
| 2,014,264 | Patrick | Sept. 10, 1935 |
| 2,330,366 | Jayne | Sept. 28, 1943 |

FOREIGN PATENTS

| | | |
|---|---|---|
| 495,267 | Great Britain | Nov. 10, 1938 |
| 563,940 | Great Britain | Sept. 6, 1944 |